United States Patent [19]

Matsuda

[11] Patent Number: 4,707,758
[45] Date of Patent: Nov. 17, 1987

[54] FAIL-SAFE SYSTEM IN A POWER REGULATION CIRCUIT FOR AN AUTOMOTIVE ELECTRONIC CIRCUIT

[75] Inventor: Toshiro Matsuda, Zama, Japan

[73] Assignee: Nissan Motor Company, Limited, Yokohama, Japan

[21] Appl. No.: 423,186

[22] Filed: Sep. 24, 1982

[30] Foreign Application Priority Data

Sep. 29, 1981 [JP] Japan .................................. 56-152969

[51] Int. Cl.[4] ........................ H02H 7/09; H02H 7/093
[52] U.S. Cl. ...................................... 361/18; 340/636; 361/90
[58] Field of Search ...................... 303/92; 361/18, 90, 361/87; 307/355, 269, 356, 297; 340/636, 663; 323/267, 280, 281

[56]  References Cited
U.S. PATENT DOCUMENTS

| 3,225,257 | 12/1965 | Fegley | 361/18 |
| 3,394,270 | 7/1968 | Pollack | 307/356 |
| 3,637,264 | 1/1972 | Leiber et al. | 303/21 |
| 3,744,851 | 7/1973 | Burckhardt et al. | 303/21 |
| 3,813,667 | 5/1974 | Smith | 361/90 X |
| 3,874,743 | 4/1975 | Fleischer et al. | 305/92 |
| 4,045,732 | 8/1977 | Yashiro et al. | 361/87 X |
| 4,049,326 | 9/1977 | Zobel | 303/92 |
| 4,156,280 | 5/1979 | Griess | 361/90 X |
| 4,246,566 | 1/1981 | Endo et al. | 340/52 F |
| 4,258,310 | 3/1981 | Asakawa et al. | 340/636 X |

FOREIGN PATENT DOCUMENTS 51-6038  2/1976  Japan .

Primary Examiner—J. R. Scott
Assistant Examiner—A. Jonathan Wysocki
Attorney, Agent, or Firm—Schwartz, Jeffery, Schwaab, Mack, Blumenthal & Evans

[57] ABSTRACT

A fail-safe system in a power regulation circuit for an automotive electronic circuit such as electronic anti-skid brake control system, which fail-safe system can perform fail-safe operation even when the power regulation circuit is damaged and thereby the supply voltage from the power regulation circuit varies significantly. The fail-safe system in a power regulation circuit includes a monitor power supply circuit independently of the power regulation circuit. The monitor power supply circuit is adapted to produce a reference signal to be compared with the output of the power regulation circuit in a fail-safe circuit. The fail-safe circuit produces an error signal when the output signal value drops below a given threshold defined by the reference signal value to activate an alarm signal generator and disconnect an actuator controlled by the control system in order to prevent the actuator from malfunctioning due to errors in the control system.

5 Claims, 5 Drawing Figures

FAIL-SAFE SYSTEM IN A POWER REGULATION CIRCUIT FOR AN AUTOMOTIVE ELECTRONIC CIRCUIT

BACKGROUND OF THE INVENTION

The present invention relates generally to a power regulation circuit for an automotic electronic circuit, such as an anti-skid electronic brake control system, for regulating the electrical voltage to be applied to the electronic circuit. Especially, the invention relates to a fail-safe system in the power regulation circuit for monitoring the output voltage of the power circuit and for performing a fail-safe operation if malfunction of the power circuit output is detected.

Normally, a power regulation circuit regulates the supply voltage for an automotive electronic circuit, such as an electronic anti-skid brake control system. Such a power regulation circuit compensates for variations in the vehicle battery voltage and supplies a constant voltage to the electronic circuit which, otherwise, might possibly malfunction due to variations in the power supply voltages to the digital or analog IC's or the like.

Conventionally, the power regulation circuit comprises a Zener diode which regulate the supply voltage to a constant level. Electric power is constantly applied to this Zener diode in order to produce the regulated constant voltage. Thus, the Zener diode will eventually deteriorate after long, continuous use to cause variation of the output voltage. If the Zener diode deteriorates, it is possible that the Zener diode will be damaged by relatively high voltages such as surge voltage or high voltage produced by a damaged regulator.

If the power regulation circuit is damaged, the electronic elements of the control system may be overloaded or may be caused to function erroneously. In order to prevent the control system from failing, there is provided a fail-safe circuit. For example, in an anti-skid brake control system, the fail-safe circuit is responsive to failure of the brake control system to disable the anti-skid control to return to normal braking operation. However, since the fail-safe circuit is energized with electrical power from the power regulation circuit, it is liable to be influenced by variation of the supplied voltage from the power regulation circuit. Thus, the fail-safe operation of the fail-safe circuit is uncertain and unreliable.

In another approach for fail-safing in the control system, a monitor circuit associated with the power regulation circuit is provided to detect errors or faults in the power regulation circuit. Such a monitor circuit will include an indicator for announcing the fault in the power regulation circuit. However, since such a monitor circuit is energized with the regulated voltage from the power regulation circuit, it is liable to be influenced by variation of the regulated voltage.

SUMMARY OF THE INVENTION

Therefore, it is an object of the present invention to provide a fail-safe system in a power regulation circuit for an automotive electronic circuit such as electronic anti-skid brake control system, which fail-safe system can perform the fail-safe operation even when the power regulation circuit is damaged and thereby the supply voltage from the power regulation circuit changes significantly.

In order to accomplish the above-mentioned and other objects, a fail-safe system in a power regulation circuit includes a monitor power supply circuit independent of the power regulation circuit. The monitor power supply circuit is adapted to produce a reference signal to be compared with an output of the power regulation circuit in a fail-safe circuit. The fail-safe circuit produces an error signal when the output signal value drops below a given threshold defined by the reference signal value to activate an alarm signal generator and disconnect an actuator controlled by the control system in order to prevent the actuator from malfunction due to faulty operation of the control system.

According to one embodiment of the present invention, the fail-safe system in the power regulation circuit comprises a power source, the power regulation circuit connected to the power source and adapted to regulate electrical power to be supplied to the automotive electronic circuit, a monitor power supply circuit independent of said power regulation circuit connected to the power source and adapted to produce a reference voltage to be compared with the output voltage of the power regulation circuit, which reference voltage is representative of an allowable variation range of the output voltage of said power regulation circuit, and means for comparing the output voltage of the power regulation circuit with the reference voltage and producing a disabling signal for disabling the automotive electronic circuit when the output voltage is out of the allowable variation range.

BRIEF DESCRIPTION OF THE DRAWINGS

The present invention will be understood more fully from the detailed description given herebelow and from the accompanying drawings of the preferred embodiment of the invention, which, however, should not be taken as limitative to the invention but for elucidation and explanation only.

In the drawings.

DESCRIPTION OF THE PREFERRED EMBODIMENT

Figure 1:
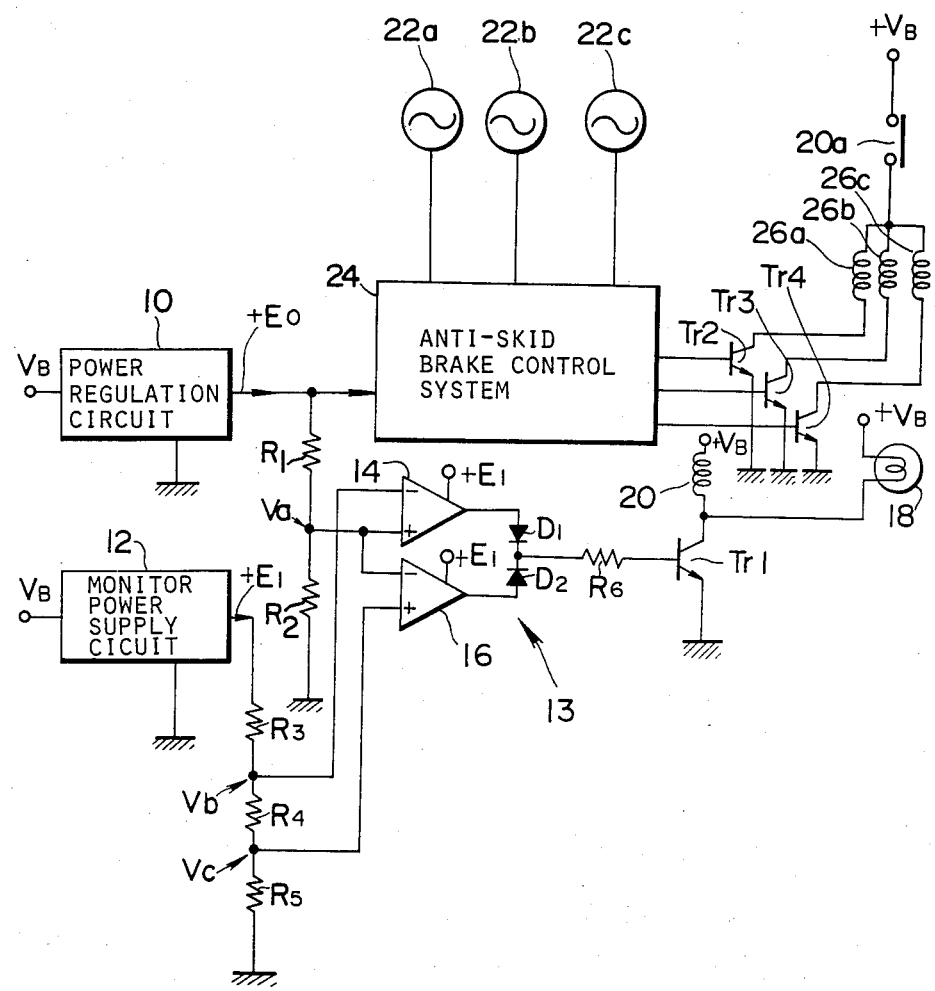
FIG. 1 is a schematic block diagram of the first embodiment of a fail-safe system in a power regulation circuit of an electronic anti-skid brake control system.

Referring now to the drawings, particularly to FIG. 1, there is illustrated the first embodiment of the fail-safe system in a power regulation circuit of the present invention. The power regulation circuit 10 is connected to an electronic anti-skid control system 2 to supply a given constant voltage of electrical power to the latter. The anti-skid control system 2 is connected to wheel r.p.m. sensors 22a, 22b and 22c to receive sensor signals respectively representative of driving and driven wheel speeds. Based on the sensor signals, the anti-skid control system 2 activates and deactivates electromagnetic actuators 26a, 26b and 26c through transistors Tr₂, Tr₃ and Tr₄. The electromagnetic actuators 26a, 26b and 26c control application and release of wheel cylinders in a hydraulic brake system for preventing vehicle wheels from skidding. The electromagnetic actuators 26a, 26b and 26c are connected to a power source, i.e., the vehicle battery via a relay switch 20a.

The power regulation circuit 10 is also connected to a fail-safe circuit 13. To the fail-safe circuit 13 is also connected to monitor power supply circuit 12 which is, in turn, connected to the vehicle battery acting as a power source $V_B$. The fail-safe circuit 13 includes a pair of comparators 14 and 16. The positive input terminal (+) of the comparator 14 is connected to the power regulation circuit 10 via dividing resistor $R_1$ and to ground via dividing resistor $R_2$. Likewise, the negative input terminal (−) of the comparator 16 is connected to the power regulation circuit 10 and ground via the dividing resistors $R_1$ and $R_2$ respectively. The positive input terminal (+) of the comparator 14 and the negative input terminal (−) of the comparator 16 thus receive the divided voltage $V_a$. Here, assuming the resistance values of the dividing resistors $R_1$ and $R_2$ are respectively $r_1$ and $r_2$, and the output voltage of the power regulation circuit 10 is $E_0$, the input voltage $V_a$ to the comparator 14 and 16 from the power regulation circuit can be calculated by the following equation:

$$V_a = \frac{r_2}{r_1 + r_2} \times E_0$$

On the other hand, the negative input terminal (−) of the comparator 14 is connected to the monitor power supply circuit 13 via dividing resistor $R_3$, and to ground via dividing resistors, $R_4$ and $R_5$. The positive input terminal (+) of comparator 16 is also connected to the monitor power supply circuit 12 via the dividing resistors $R_3$ and $R_4$ and to ground via dividing resistor $R_5$. The input, voltages $V_b$ and $V_c$ respectively applied to the comparators 14 and 16 can be respectively expressed by the following equations:

$$V_b = \frac{r_4 + r_5}{r_3 + r_4 + r_5} \times E_1$$

$$V_c = \frac{r_5}{r_3 + r_4 + r_5} \times E_1$$

where
$r_3$ is resistance value of resistor $R_3$
$r_4$ is resistance value of resistor $R_4$
$r_5$ is resistance value of the resistor $R_5$
$E_1$ is output voltage of the monitor power supply circuit.

Here, as seen from FIG. 1, the comparators 14 and 16 are energized with voltage $E_1$ from the monitor power supply circuit 12.

Therefore, the comparator 14 is adapted to produce a HIGH level comparator signal when the signal voltage $V_a$ is larger than that of $V_b$. On the other hand, the comparator 16 is adapted to produce a HIGH level comparator signal when the signal voltage $V_a$ is smaller than that of $V_c$. The output terminals of the comparators 14 and 16 are respectively connected to a base electrode of a transistor $Tr_1$ via respective diodes $D_1$ and $D_2$ and a common resistor $R_6$. The collector electrode of the transistor $Tr_1$ is connected to a fault indicator lamp 18 and, in turn, to a relay coil 20 which serves as a collector load.

The anti-skid brake control system is constructed in per se known circuit construction as discloses in U.S. Pat. No. 3,744,851 to Burckhardt et al, for example. Other anti-skid control systems have been disclosed in British Patent Prepublications Nos. 2,061,435, 2,062,786 and 2,066,894. The disclosures in the above-referred publications are hereby incorporated by reference. As is well known, the electronic anti-skid control system generally controls application and release of brake pressure in the wheel cylinder in order to control tread/road friction to near the maximum value. The anti-skid control system produces a control signal to be fed to the electromagnetic actuators 26a, 26b and 26c to control actuation of the fluid pressure in the wheel cylinder of the hydraulic brake system.

As will be appreciated, the anti-skid control system can comprise a digital circuit including CMOS and/or TTL elements, or an analog circuit including an operational amplifier, comparators and so forth. Either of the digital and analog circuits would be influenced by variations in the power regulations circuit output voltage. In the case of a TTL-based anti-skid brake control system, the allowable voltage variation of the power regulation circuit 10 is within the range $5.25 \, V\text{-}\alpha < E_0 < 5.25 \, V + \alpha$, where $\alpha$ is the allowable voltage variation of the TTL circuit elements.

When the power regulation circuit 10 is damaged or malfunctions to produce a higher output voltage than normal, the input voltage $V_a$ to the comparators 14 and 16 becomes greater than normal corresponding to the increase of the output voltage of the power regulation circuit. Thus, the input voltage $V_a$ becomes higher than the input voltage $V_b$. The comparator 14 thus produces a HIGH level comparator signal. The HIGH level comparator signal of the comparator 14 is fed to the transistor $Tr_1$ via the diode $D_1$ and the resistor $R_6$. The transistor $Tr_1$ is turned off in response to the HIGH level comparator signal from the comparator 14 to produce a bias voltage at the collector electrode thereof. The bias voltage of the transistor $Tr_1$ is fed to the indicator lamp 18 to turn the latter on. At the same time, the relay coil 20 is energized by the bias voltage of the transistor $Tr_1$ to open the relay switch 20a. As a result, the electromagnetic actuators 26a, 26b and 26c are disconnected from the power source, i.e., from the vehicle battery, to be rendered inactive.

Alternatively, if damage to or a malfunction of the power regulation circuit 10 causes a significant drop in the output voltage, the input voltage $V_a$ to the positive input terminal of the comparator 14 and the negative input terminal of the comparator 16 becomes lower than normal. This causes the comparator 16 to produce a HIGH level comparator signal to be fed to the transistor $Tr_1$ via the diode $D_2$ and the resistor $R_6$. As in the foregoing case, the transistor $Tr_1$ is cut-off by the HIGH level comparator signal of the comparator 16 to turn on the indicator lamp 18 and energize the relay coil.

As will be appreciated, as long as the power regulation circuit is in the normal state and produces a voltage within the predetermined allowable voltage variation range, the comparator signals of the comparator 14 and 16 are maintained at LOW level to keep the transistor $Tr_1$ ON. In this case, the indicator lamp 18 is maintained OFF and the relay coil 20 is deenergized to allow power supply to the electromagnetic actuators 26a, 26b and 26c to make the anti-skid control system active.

It should be noted that, in order to prevent the fail-safe circuit 13 from malfunctioning due to sudden significantly HIGH voltages, comparators 14 and 16 must be designed to withstand even substantially HIGH voltages, i.e., voltages exceeding 12 V. This will ensure the operation of the fail-safe system of the shown embodiment.

Figure 2:
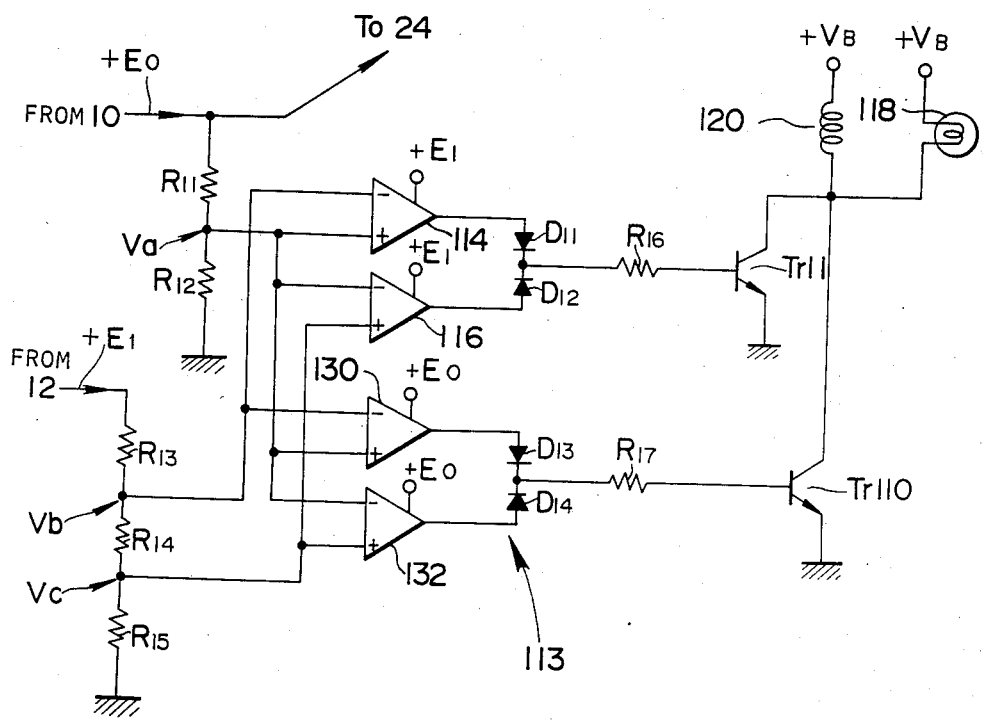
FIG. 2 is a circuit diagram of a modification of the fail-safe system of FIG. 1.

Referring to FIG. 2, there is illustrated a modification of the fail-safe circuit in FIG. 1. In this modification, the fail-safe circuit 113 comprises two pairs of comparators 114, 116 and 130, 132. The power regulation circuit 10 and ground are connected to positive input terminals (+) of the comparators 114 and 130 and to negative input terminals (−) of the comparators 116 and 132, via dividing resistors $R_{11}$ and $R_{12}$ respectively, as in the foregoing embodiment. As in the foregoing embodiment, the monitor power supply circuit 12 and ground are connected to the negative input terminal (−) of the comparator 114 and the positive input terminal (+) of the comparator 116 via the dividing resistors $R_{13}$, $R_{14}$ and $R_{15}$. As set forth, the positive input terminal of the comparator 114 and the negative input terminal of the comparator 116 receive divided voltage $V_a$. The negative input terminal of the comparator 114 receives the divided voltage $V_b$ and the positive input terminal of the comparator 116 receives the divided voltage $V_c$. Thus, the comparators 114 and 116 act similarly to the foregoing embodiment to turn on the transistor $Tr_{11}$ via the diodes $D_{11}$ and $D_{12}$ and the common resistor $R_{16}$ when the input voltage $V_a$ from the power regulation circuit 10 is out of a given range defined by the input voltage from the monitor power supply circuit 12 and resistors $R_{13}$, $R_{14}$ and $R_{15}$. The indicator 118 is turned on and the relay coil 120 is energized when the transistor is cut-off. The comparators 114 and 116 receive power from the monitor power supply circuit 12 for operation and, in turn, the comparators 130 and 132 receive power from the power regulation circuit 10.

The comparator 130 and 132 are adapted to monitor the monitor power supply circuit 12 for malfunctions. As with the comparators 114 and 116, the positive input terminal of the comparator 130 and the negative input terminal of the comparator 132 receive divided voltage $V_a$. The negative input terminal of the comparator receives the input voltage $V_b$ from the monitor power supply circuit 12 via the dividing resistors $R_{13}$, $R_{14}$ and $R_{15}$. Similarly, the divided voltage $V_c$ from the dividing resistors $R_{13}$, $R_{14}$ and $R_{15}$ is applied to the positive input terminal of the comparator 132. The comparator 130 thus compares the input voltages $V_a$ and $V_b$ and produces a HIGH level comparator signal when the input voltage $V_a$ is larger than $V_b$. On the other hand, the comparator 132 is adapted to produce a HIGH level comparator signal when the input voltage $V_a$ is less than $V_c$.

The comparators 130 and 132 are connected to the base electrode of a transistor $Tr_{110}$ via respective diodes $D_{13}$ and $D_{14}$ and a common resistor $R_{17}$. The transistor $Tr_{110}$ is responsive to application of a HIGH level comparator signal via the resistor $R_{17}$ to turn OFF. The transistor $Tr_{110}$ is connected to the indicator lamp 118 and the relay coil 120. Thus, the indicator lamp 118 is turned ON and the relay coil 120 is energized.

Therefore, in the shown modification, the fail-safe circuit 113 monitors not only the output voltage of the power regulation circuit 10 but also the output voltage of the monitor power supply circuit 12.

Figure 3:
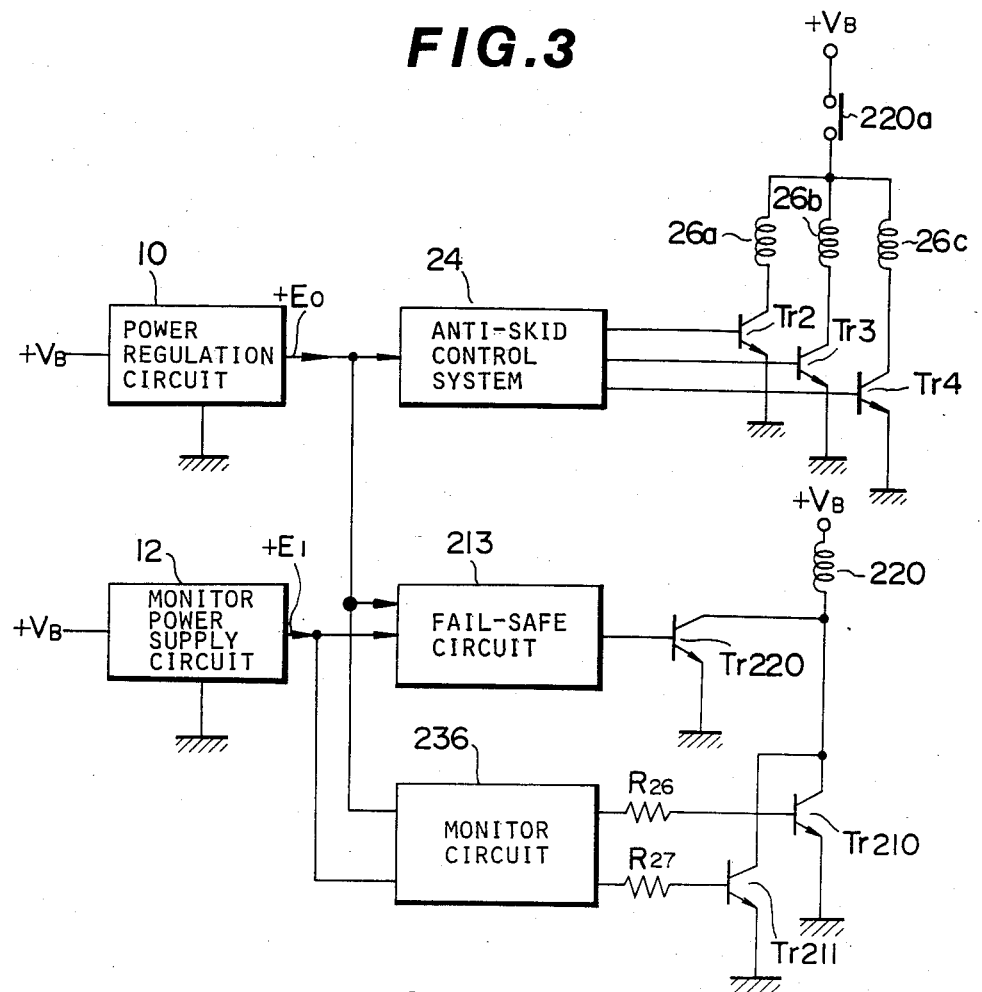
FIG. 3 is a schematic block diagram of the second embodiment of the fail-safe system in the power regulation circuit for the electronic anti-skid control system.

FIG. 3 is a schematic block diagram of the second embodiment of the fail-safe system for the power regulation circuit according to the present invention. In this embodiment, the fail-safe circuit 213 has substantially the same circuit construction as set forth with respect to the first embodiment. The fail-safe circuit 213 is connected to the monitor power supply circuit 12 to receive operational power for the comparators. Likewise, the anti-skid control system has substantially the same circuit construction as that disclosed with reference to FIG. 1.

Figure 5:
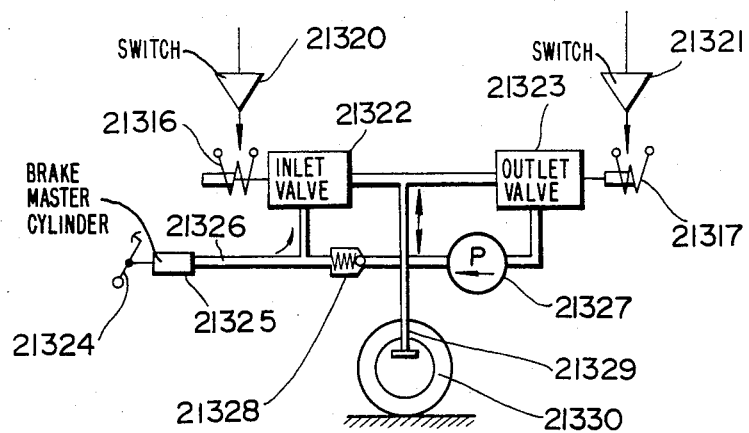
FIG. 5 is a block diagram of a hydraulic brake system suitable for control by the anti-skid control system employing the fail-safe arrangement of the present invention.
Figure 4:
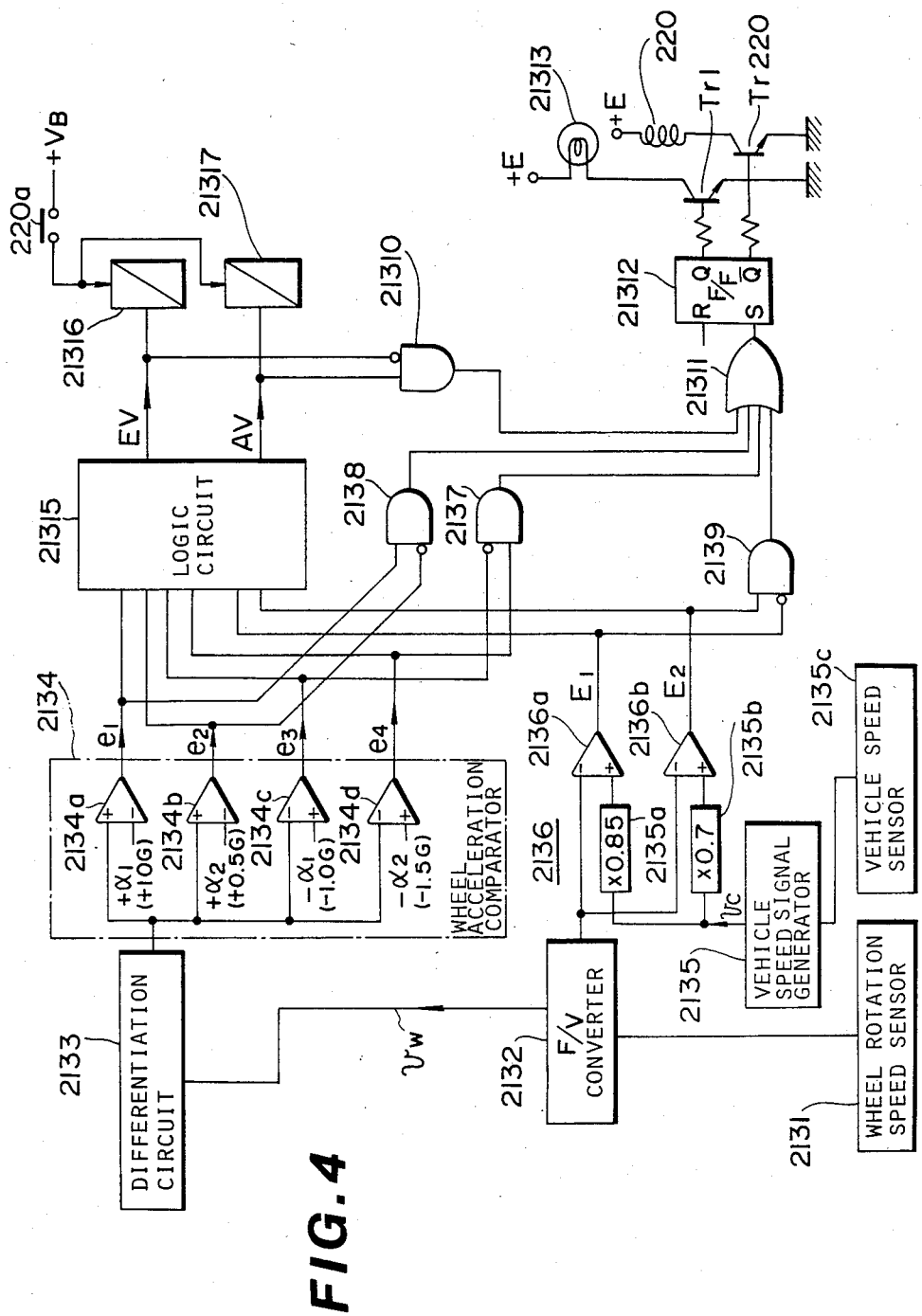
FIG. 4 is a circuit diagram of the preferred embodiment of the anti-skid control system with a fail-safe arrangement according to the present invention.

In FIG. 3, a monitor circuit 236 corresponding to the fail-safe circuit 113 of FIG. 2 is connected to the power regulation circuit 10 and the monitor power supply circuit 12. The monitor circuit 236 is adapted to monitor both of the input voltages $E_0$ and $E_1$ from the power regulation circuit 10 and the monitor power supply circuit 12 respectively. The monitor circuit 236 is connected to base electrodes of transistors $Tr_{210}$ and $Tr_{211}$ via respective resistors $R_{26}$ and $R_{27}$. As in the foregoing embodiment, the transistors $Tr_{210}$ and $Tr_{211}$ will be cut off when the corresponding one of the power regulation circuit 10 and the monitor power supply circuit 12 outputs an excessively high or low voltage in order to actuate the relay coil 220. Likewise, the transistor $Tr_{220}$ connected to a fail-safe system 213 for any of automotive control system will be cut off if the output voltage is out of the allowable voltage range to energize the relay coil. FIGS. 4 and 5 show one example of the fail-safe system which is applied for an anti-skid brake control system.

Referring now to FIG. 4, there is illustrated the preferred embodiment of an anti-skid control system with the fail-safe arrangement of the present invention. A wheel rotation speed sensor 2131 is adapted to produce a pulse, train with a frequency proportional to the wheel rotation speed. The pulse train is converted into an analog signal by a frequency-to-voltage converter (F/V converter) 2132, which analog signal $V_w$ has a voltage proportional to the wheel rotation speed. Based on the variation of the analog signal value, a differentiation circuit 2133 produces a signal $\alpha_w$ at a voltage representative of instantaneous wheel acceleration. The signal $\alpha_w$ is fed to a wheel acceleration comparator 2134 which comprises first to fourth differential amplifiers 2314a to 2134d. The signal $\alpha_w$ is inputted to the positive input terminals (+) of the first and second differential amplifiers 2134a and 2134b and to the negative input terminals (−) of the differential amplifiers 2134c and 2134d. The negative input terminals of the differential amplifiers 2134a and 2134b respectively receive reference voltages $\alpha_1$ and $\alpha_2$ corresponding to acceleration levels of 1.0G and 0.5G. On the other hand, the positive input terminals of the differential amplifiers 2134c and 2134d receive reference voltages $\alpha_3$ and $\alpha_4$ respectively corresponding to acceleration levels of −1.0 G and −1.5 G. Therefore, when the signal value of the signal $\alpha_w$ is greater than the reference voltages $\alpha_1$ and $\alpha_2$, the outputs $e_1$ and $e_2$ of the differential amplifiers 2134a and 2134b will be HIGH and outputs $e_3$ and $e_4$ of the remaining differential amplifiers 2134c and 2134d will be maintained at LOW level. When the wheel acceleration drops to less than 1.0 G but is still greater than 0.5 G, then the output $e_1$ of the differential amplifier 2134a turns to LOW level and the output $e_2$ is maintained at HIGH level.

On the other hand, when the wheel acceleration $a_w$ is in the range between 0.5 G and $-1.0$ G, the outputs of all the differential amplifiers 2134a to 2134d are LOW level. As the wheel decelerates and thus, the signal value $a_w$ of the signal $a_w$ drops to a value less than the reference voltage $a_3$, the output $e_3$ of the differential amplifier 2134c goes HIGH and the other output signals remain LOW. As the wheel decelerates further to become lower than $-1.5$ G, the voltage of the signal $a_w$ drops below the reference voltage $a_4$, then the outputs $e_3$ and $e_4$ both go HIGH. The outputs of the differential amplifiers 2134a to 2134d in relation to the wheel acceleration $a_w$ are summarized in the following table:

|  | $a_w$ | $a_w > +a_1$ | $+a_1 > a_w > +a_2$ | $+a_2 > a_w > a_3$ | $a_3 > a_w > a_4$ | $a_4 > a_w$ |
|---|---|---|---|---|---|---|
| 2134a | ($e_1$) | H | L | L | L | L |
| 2134b | ($e_2$) | H | H | L | L | L |
| 2134c | ($e_3$) | L | L | L | H | H |
| 2134d | ($e_4$) | L | L | L | L | H |

As will be appreciated, all possible combination of the outputs $e_1$ to $e_4$ are shown hereabove. If a combination different from the shown five combinations occurs, it means that the anti-skid control is malfunctioning. Therefore, by detecting combinations different from the foregoing five combinations, errors in the anti-skid control can be detected.

On the other hand, a vehicle speed sensor 2135c produces a vehicle speed signal indicative of the vehicle speed. The vehicle speed signal is fed to a vehicle speed signal generator 2135 which is adapted to produce a reference signal Vc at a voltage related to vehicle speed and which changes at a rate related to vehicle acceleration. The reference signal Vc is fed to reference voltage generators 2135a and 2135b. The reference voltage generator 2135a produces a reference voltage $Vc_1$ having a value corresponding to 85% of the signal value of the reference signal Vc. On the other hand, the reference voltage generator 2135b produces a reference voltage $Vc_2$ having a value corresponding to 70% of the signal value of the reference signal Vc. The reference voltage generators 2135a and 2135b are respectively connected to positive input terminals of differential amplifiers 2136a and 2136b. The analog signal $V_w$ representative of the wheel rotation speed is also inputted to the negative input terminals of the differential amplifiers 2136a and 2136b. The differential amplifiers 2136a and 2136b vary the level of the outputs $E_1$ and $E_2$ depending on the slippage of the wheel determined on the basis of the reference voltages $Vc_1$ and $Vc_2$. The variation of the output level of the differential amplifiers 2136a and 2136b with respect to the variation of the analog signal $V_w$ in relation to the reference voltages $Vc_1$ and $Vc_2$ is illustrated in the following table:

| $V_w$ | $\lambda_0(Vw > 0.85 Vc)$ | $\lambda_1(0.85 Vc < Vw < 0.7 Vc)$ | $\lambda_2(0.7 Vc > Vw)$ |
|---|---|---|---|
| 2136a ($E_1$) | L | H | H |
| 2136b ($E_2$) | L | L | H |

The outputs $e_1$ to $e_4$ and $E_1$ and $E_2$ are fed to a logic circuit 21315. The logic circuit 21315 determines signal level of an inlet signal $E_v$ and an outlet signal $A_v$ according to the following chart:

| $e_1$ | $e_2$ | $e_3$ | $e_4$ | $E_1$ | $E_2$ | $E_v$ | $A_v$ |
|---|---|---|---|---|---|---|---|
| H | H | L | L | L | L | L | L |
| L | H | L | L | L | L | L | L |
| L | L | L | L | L | L | L | L |
| L | L | H | L | L | L | H | L |
| L | L | H | H | L | L | H | H |
| H | H | L | L | H | L | H | L |
| L | H | L | L | H | L | H | L |
| L | L | L | L | H | L | H | L |
| L | L | H | L | H | L | H | L |
| L | L | H | H | H | L | H | H |
| H | H | L | L | H | H | H | L |
| L | H | L | L | H | H | L | L |
| L | L | L | L | H | H | H | L |
| L | L | H | L | H | H | H | H |
| L | L | H | H | H | H | H | H |

The function or distinction in the logic circuit has been illustrated in detail in the above-referred U.S. Pat. No. 3,744,851.

Referring to FIG. 5, when the inlet signal $E_v$ and the outlet signal $A_v$ are both LOW, the brake pressure to be applied to wheel cylinders 21329 provided for each vehicle wheel 21330 is increased. When the inlet signal $E_v$ goes HIGH and the outlet signal $A_v$ remains LOW, the brake pressure is held constant. When the inlet signal $E_v$ and the outlet signal $A_v$ are both HIGH, the brake pressure is reduced.

To carry out the foregoing anti-skid brake control operation, the brake system is provided with an inlet valve 21322 and an outlet valve 21323 in the hydraulic circuit. The inlet valve 21322 includes an inlet valve actuator 21316 and the outlet valve 21323 includes an outlet valve actuator 21317, as shown in FIG. 5. The inlet valve 21322 is connected to a brake master cylinder 21325 to receive a working fluid through a passage 21326 and is also connected to the wheel cylinder 21329 to apply the working fluid thereto. The master cylinder 21325 responds to depression of an associated brake pedal 21324 to increase the fluid pressure within passage 21326. The working fluid is thus fed to the wheel cylinder 21329 when a brake pedal 21324 is depressed and the inlet valve 21322 is opened. The inlet valve actuator 21316 is responsive to the HIGH-level inlet signal $E_v$ to be energized and close the inlet valve. On the other hand, the outlet valve 21323 is a normally closed valve and is responsive to energization of the outlet valve actuator 21317 to open in response to the outlet signal $A_v$. When the inlet valve 21322 and the outlet valve 21323 are both closed, the fluid pressure applied to the wheel cylinder 21329 is maintained at a constant level.

The outlet valve 21323 is connected to the brake master cylinder 21325 via a fluid pump 21327 and a one-way valve 21328. When the outlet valve 21323 is open the working fluid in the passage between inlet valve 21322 and wheel cylinder 21329 is fed back to the master cylinder 21325 through the fluid pump 21327 and the one-way valve 21328. Thus, the fluid pressure applied to the wheel cylinder 21329 is decreased to release the brake pressure. The inlet and outlet valve actuators 21316 and 21317 are respectively operated by switches 21320 and 21321 which are turned on in response to the inlet and outlet signals $E_v$ and $A_v$.

Returning to FIG. 4, the fail-safe operation is carried out after detection of errors in the anti-skid brake control. In order to detect errors in the anti-skid brake control, AND gates 2137 and 2138 are provided. The AND gate 2137 has an input terminal connected to the differential amplifier 2134d and an inverting input terminal connected to the differential amplifier 2134c. As will be appreciated from the foregoing table, there are no allowable output conditions in which the output $e_3$ of the differential amplifier 2134c is LOW and the output $c_4$ of the differential amplifier 2134d is HIGH, therefore, if the AND gate 2137 outputs a HIGH signal, it means the anti-skid brake control system is malfunctioning. Likewise, by connecting the differential amplifiers 2134a and 2134b to the AND gate 2138 via an input terminal and an inverting input terminal respectively, errors in the control system can be detected.

The AND gates 2137 and 2138 produce HIGH level signals only when the acceleration comparator is malfunctioning. The output terminals of the AND gates 2137 and 2138 are connected to the SET input terminal S of an R-S-type flip-flop 21312 via an OR gate 21311. When the SET terminal receives a HIGH-level input, the flip-flop 21312 produce a SET signal at its Q-output terminal to turn ON a transistor $Tr_1$ to illuminate a fault indicator lamp 21313 and stops producing a RESET signal at its $\overline{Q}$-output terminal to turn OFF another transistor $Tr_2$ to deenergize a relay coil 21318 which opens a relay switch 21318a and thereby disables the anti-skid control operation of the inlet and outlet valve actuators 21316 and 21317.

Likewise, an AND gate 2139 is connected to the differential amplifiers 2136a and 2136b to receive the outputs $E_1$ and $E_2$. One of the input terminals of the AND gate 2139 is an inverting input terminal connected to the differential amplifier 2136a. Thus, the AND gate outputs a HIGH-level signal when the output $E_1$ of the differential amplifier 2136a is LOW and the output $E_2$ of the differential amplifier 2136b is HIGH, which is not possible under normal circumstances. The AND gate is also connected to the SET terminal of the flip-flop 21312 via the OR gate 21311 in order to disconnect the anti-skid control system when such an erroneous combination of control signals is detected.

Another AND gate 21310 is connected to the flip-flop 21312 via the OR gate 21311 for fail-safe purposes. The AND gate 21310 is connected to the logic circuit 21315 to receive the outlet signal $A_v$ at one input terminal and the inlet signal $E_v$ at an inverting input terminal. As will be appreciated from the foregoing table, it is not possible to have the inlet signal $E_v$ LOW and the outlet signal $A_v$ HIGH. Therefore, by detecting this condition, malfunction of the control system can be detected and by deactivating the relay coil 21318, the fall-safe operation can be performed.

It should be noted that when the relay switch 21318a is opened and thus both of the inlet and outlet valve actuators 21316 and 21317 are disabled, the inlet valve 21322 remains open and the outlet valve 21323 remains closed in order to enable manual braking.

It should be additionally noted that the flip-flop 21312 should be RESET initially in order to enable automatic anti-skid control. This can be realized in any of a number of ways which will occur to those skilled in the art.

As set forth, according to the present invention, errors in the anti-skid control system can be satisfactorily detected and fail-safe operation can be performed by disabling the control system.

As described hereabove, the fail-safe system according to the present invention can satisfactorily and successfully prevent the control system from failing even when the power regulation circuit therefor is damaged or malfunctions.

While the present invention has been described in detail in terms of the specific embodiment for embodying the present invention, it should be understood that the invention can be embodied otherwise and modified in any way without departing from the principle of the invention. Therefore, the invention should be understood as including all of the possible embodiments or modifications in the principle.

What is claimed is:

1. A fail-safe system in a power regulation circuit of an automotive electronic circuit, comprising:
   a power source producing unregulated output power;
   the power regulation circuit connected to said power source and adapted to regulate said unregulated output power to produce regulated system power having a substantially constant output voltage, and to supply said regulated system power to said automotive electronic circuit;
   a monitor power supply circuit connected to said power source independently of said power regulation circuit and adapted to produce a reference voltage to be compared with said output voltage of said power regulation circuit, said reference voltage representative of an allowable range of variation of said output voltage of said power regulation circuit; and
   means for comparing said output voltage of said power regulation circuit with said reference voltage and for disabling said automotive electric circuit when said output voltage is out of said allowable range, and also for monitoring said reference voltage utilizing said output voltage of said power regulation circuit for detecting malfunction of said monitor power supply circuit to disable said automative electric circuit when malfunction of said monitor power supply circuit is detected.

2. A fail-safe system in a power regulation circuit of an automotive electronic circuit, comprising:
   a power source producing unregulated output power;
   the power regulation circuit connected to said power source and adapted to regulate said unregulated output power to produce regulated system power having a substantially constant output voltage, and to supply said regulated system power to said automotive electronic circuit;
   a monitor power supply circuit connected to said power source independently of said power regulation circuit and adapted to produce a reference signal; and means for produce first and second reference voltages to define an allowable range of variation of the output voltage of said power regulation circuit on the basis of said reference signal, for detecting when said output voltage of said power regulation circuit is out of said allowable range for disabling said automotive electronic circuit in response thereto, and for monitoring said reference signal for detecting failure of operation of said monitor power supply circuit based on variation of said reference signal value and disabling said electronic circuit when failure of operation of said monitor power supply circuit is detected.

3. A fail-safe system in a power regulation circuit of an electronic anti-skid brake control system, comprising:

a power source;

a power regulation circuit connected to said power source for outputting electrical power having a substantially constant voltage and said anti-skid brake control system;

a monitor power supply circuit connected to said power source independently of said power regulation circuit and adapted to produce a constant voltage reference signal; and means for producing first and second reference voltages from said constant voltage reference signal to define an allowable range of variation of said output voltage of said power regulation circuit, for detecting when the output voltage is out of said allowable variation range to disable said anti-skid brake control system, for monitoring said constant voltage reference signal to detect fluctuation of said reference signal voltage, and for disabling said anti-skid brake control system if said fluctuations are detected.

4. The system as set forth in claim 1, 2 or 3, which further comprises an indicator lamp responsive to said means for indicating malfunction of said power regulation circuit when the output voltage is out of said allowable variation range.

5. A fail-safe system in a power regulation circuit of an automotive electronic circuit comprising:

a power source producing unregulated output power, said power source supplying unregulated output power;

the power regulation circuit connected to said power source and regulating said unregulated output power to produce regulated system power having a substantially constant output voltage, and supplying said regulated system power to said automotive electronic circuit;

a monitor power supply circuit connected to said power source to receive said unregulated output power independently of said power regulation circuit and producing a reference voltage to be compared with said output voltage of said power regulation circuit, said reference voltage representative of an allowable range of variation of said output voltage of said power regulation circuit; and means for comparing said output voltage of said power regulation circuit with said reference voltage and for disabling said automotive electric circuit when said output voltage is out of said allowable variation range, whereby the regulated system power from said power regulation circuit which is outside of said allowable range can be detected even when said power source for said power regulation circuit fluctuates.

* * * * *